H. B. TAYLOR.
COMPUTING TOLL RATE MAP.
APPLICATION FILED OCT. 19, 1910.
1,205,811. Patented Nov. 21, 1916.
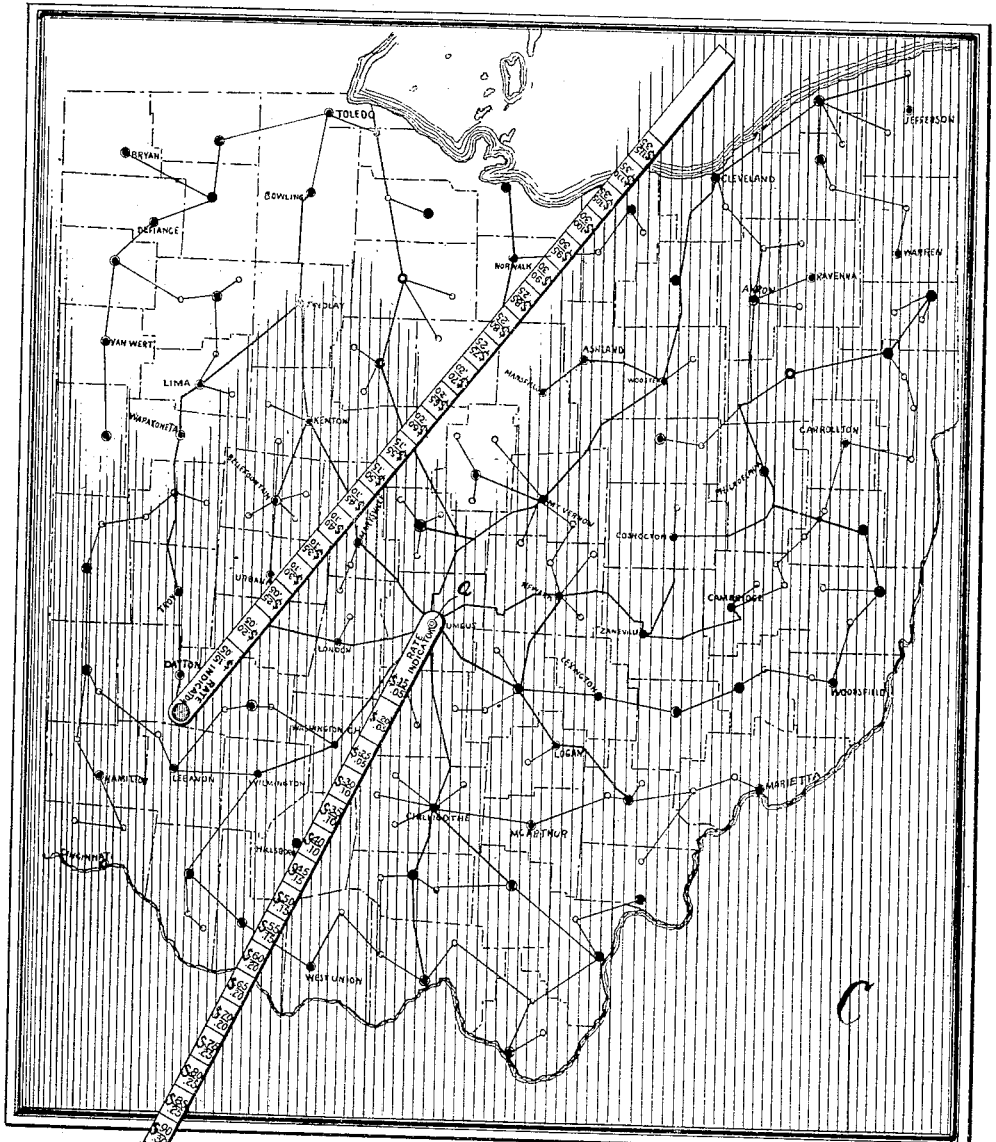
Fig.1
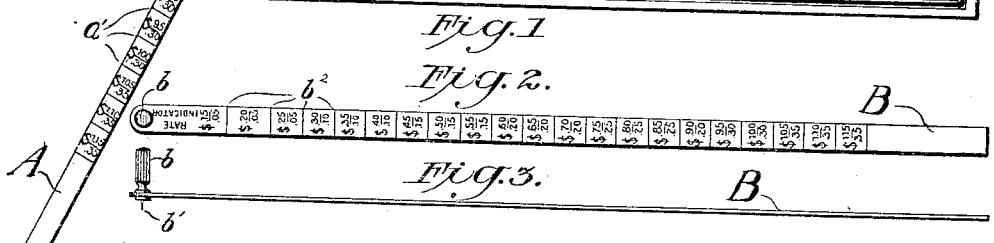
Fig.2
Fig.3
Witnesses:
H. J. Löwenstein
James H. Marr
Inventor:
Herbert B. Taylor
by Edward E. Clement
atty

UNITED STATES PATENT OFFICE.

HERBERT B. TAYLOR, OF COLUMBUS, OHIO.

COMPUTING-TOLL-RATE MAP.

1,205,811.   Specification of Letters Patent.   Patented Nov. 21, 1916.

Application filed October 19, 1910. Serial No. 587,868.

*To all whom it may concern:*

Be it known that I, HERBERT B. TAYLOR, a citizen of the United States, residing at Columbus, in the county of Franklin, State of Ohio, have invented certain new and useful Improvements in Computing-Toll-Rate Maps, of which the following is a specification, reference being had therein to the accompanying drawing.

My invention relates principally to means for indicating or exhibiting toll and transportation rates and charges in systems of communication and transportation and points and locations on maps generally.

Specifically stated, the invention is a map or chart of any given territory with an indicator or indicators, and is illustrated herein by a telephone toll map, but the invention is capable and designed for divers other applications and uses, to such as railway, express, and telegraph systems, and the like.

The essential features of the invention are a map or chart showing to scale the relative location of points and centers between which toll charges or tariffs are to be determined, together with one or more indicators or gages having pivot points at one end of each and graduated so as to show base charges for zones of variable radii around any given center.

My invention is illustrated in the accompanying drawings in which:

Figure 1 is a face view of the device complete. Fig. 2 is a plan view of a rate indicator or scale detached. Fig. 3 is an edge view of the same.

Referring first to Fig. 1, I may remark that devices of this character may be subjected to hard usage and for this reason as well as to make the device sanitary, I use for the body of the map any approved map material of sufficient density to sustain an indicator, and for illustration is used a sheet of celluloid C. Upon this I imprint or draw with ink of an indelible character the outlines, political divisions and natural features of the territory over which the computation is to extend. In the illustration, the particular territory selected is the State of Ohio. The counties are indicated, main telephone trunk lines between centers of population are shown in somewhat heavy black lines, and subsidiary toll and connecting lines are shown with less prominence.

As a means for measuring the rate to be charged for any given use of the line or locating designated points on the map, I provide a pivoted scale or indicator which is applied in two forms.

The first form is indicated by the reference letter A, and is permanently pivoted to the body of the chart at $a$, so as to rotate about the city of Columbus as the center of system.

The second form is shown in Figs. 2 and 3, is marked B, and carries at one end a knob or finger-hold $b$, with an opposed pivot point $b'$, which may be applied to any point on the surface of the chart, and the indicator rotated about the same.

In either form, the indicator attached to any given point on the map will enable a direct reading to be had of the base charge or toll rate to any other given point, as well as the rate for overtime. Such rates are usually based on mileage, and in the present case, for purposes of illustration, on land air line mileage. The base charge or toll rate covers a period of three minutes' use of the lines between two points, and the overtime charge is for each additional minute. In the territory selected, these rates are figured on the basis of two-third cents per mile, but obviously the rates in other territory might vary from this, and the indicator would vary accordingly in its readings.

To give direct reading, each indicator is graduated as shown at $a'$ or $b^2$, the graduated lines being spaced apart according to the mileage so as to describe zones around the selected center, and in the space between each pair of lines the indicator carries figures indicating the rates for the corresponding zone. As a matter of convenience, I usually print each figure representing the base charge or three minute rate in black ink, and the overtime charge per minute in red, but any other colors are equally as adaptable for the purpose.

It should be observed that the subdivision in terms of mileage is confined within arbitrary limits, as it would be impracticable to bring this down to single miles. The zones are therefore determined with some regard to traffic conditions, and the rate fixed accordingly, preferably in multiples of a half dime. For reasons of policy, the base charges and the overtime charges do not necessarily increase in exactly the same ratio, nor both in exact proportion to the distance. Thus it will be noted in Fig. 2 that the base charge marked upon indicator A for the first three zones from the center increases from fifteen to twenty-five cents, while the overtime charge per minute remains constant. The indicator is thus something more than a mere scale, and represents in effect a condensation of a very large number of separate schedules, reduced to a uniform graduation.

The indicators are best made of celluloid or any other adaptable material which is durable and easily cleaned, and having also the property of receiving and retaining impressions or ink marks when once set with permanence and sharpness.

The application of this device to other systems of communication than telephone systems, and to systems of transportation as well, will be apparent after reading this description.

In making up schedules for filing and distribution among subsidiary centers either in railroad, telephone, telegraph and other like operation, and for filing with the Interstate Commerce Commission or the sundry other utility and regulatory commissions of the several States, it has heretofore been necessary to first compile all the various rates, and then tabulate these for every center. Such schedules are necessarily very voluminous, and correspondingly costly, as well as subject to errors and inaccuracy. All of this is avoided by the use of my invention, each map with its appropriate indicator being complete in itself, and replacing the entire set of schedules for the territory it represents. In the example described and illustrated, a single State is taken as the territory, but obviously any number of States or countries may be included, and the graduations on the indicators may show numberless variations, differential rates, and the like.

I believe myself to be the first inventor of a device embodying the principle herein set forth, and the claims hereto appended are therefore to be read with a broad scope.

I am aware that changes may be made in form, in the material employed, and in other particulars, but such changes I consider non-essential so far as the principal underlying feature is concerned, and it is to be understood that they are included within the purview of my claim.

Having thus described my invention, what I claim and desire to secure by Letters Patent of the United States is:

A toll indicator or schedule of charges comprising a flat body having delineated upon its surface a map showing traffic, telephonic or telegraphic centers and having a plurality of fixed pivot points, one for each center at which originating connections are to be computed, and a straight elongated scale having at one end a projecting pin or pivot point adapted to coöperate with any of said fixed points, and a handle connected to said pivot point, with the scale body pivoted thereon, so that the point may be attached with exactness to a center of communication from which tolls are to be computed and the scale easily rotated thereon, said scale carrying a double series of graduations one showing base charges and the other over-time charges, arranged in terms of mileage for zones arbitrarily determined with reference to the traffic in each zone or radial distance around the center, said base and over-time graduations being inscribed for each zone with figures or indicia representing the tariff charges for said zone, the figures or indicia of the two sets of charges being of distinctive character as for example of different colors, whereby base charges and over-time charges may vary in ratio as determined by necessary policy growing out of traffic conditions for any given zone distance from centers in the territory covered by the map.

In testimony whereof I affix my signature in presence of two witnesses.

HERBERT B. TAYLOR.

Witnesses:
 M. L. FULLER,
 W. L. CARY.

Copies of this patent may be obtained for five cents each, by addressing the "Commissioner of Patents, Washington, D. C."